US005181303A

United States Patent [19]

Gregg

[11] Patent Number: 5,181,303

[45] Date of Patent: Jan. 26, 1993

[54] DISLODGEMENT DEVICE

[76] Inventor: John Gregg, 2475 Cerritos Ave., Signal Hill, Calif. 90806

[21] Appl. No.: 809,900

[22] Filed: Dec. 18, 1991

[51] Int. Cl.$^5$ .......... B23P 19/04

[52] U.S. Cl. .......... 29/255

[58] Field of Search .......... 29/254, 255, 275

[56] References Cited

U.S. PATENT DOCUMENTS

| | | |
|---|---|---|
| 189,617 | 1/1833 | Johnson et al. . |
| 268,328 | 11/1882 | Webber . |
| 802,588 | 10/1905 | Parks . |
| 1,381,890 | 6/1921 | Brouhard et al. . |
| 1,525,894 | 2/1925 | Seppmann . |
| 1,627,477 | 5/1927 | Blune et al. . |
| 1,747,053 | 2/1930 | Colerick . |
| 1,870,711 | 8/1932 | Cooney . |
| 1,996,967 | 4/1935 | Kratky . |
| 2,519,204 | 8/1950 | Sturm . |
| 2,561.577 | 7/1951 | Knudsen . |
| 2,851,769 | 9/1958 | Johnson . |
| 3,177,571 | 4/1965 | Carlson et al. . |
| 3,280,455 | 10/1966 | Smith . |
| 3,739,452 | 6/1973 | Gadberry . |
| 4,122,599 | 10/1978 | Lunycz . |
| 4,125,938 | 11/1978 | Clark . |

FOREIGN PATENT DOCUMENTS

| | | |
|---|---|---|
| 189617 | 1/1964 | Sweden . |
| 430525 | 1/1975 | U.S.S.R. . |

*Primary Examiner*—Robert C. Watson

*Attorney, Agent, or Firm*—Robbins, Dalgarn, Berliner & Carson

[57] ABSTRACT

A device for dislodging an object, for example a cap that is close fit over the top of a pipe, in which a handle and a grip, each formed to be held by the respective hands of a user, are interconnected with a weight member and an impact member, such as a pair of tongs. Slide bars fixed to the weight member are disposed through one end of the grip and connected to the handle. A shank is slidably disposed through the weight, connected to the grip on one side of the weight and to the tongs on the other side of the weight. The tongs include a plurality of pivotally connected links and are formed with elongate arms terminating distally with jaws formed to impact against a horizontally disposed surface of the cap. The tongs tend to close when freely suspended from the shank so as to slip over the cap on a pipe, contacting it from below the cap. Lifting of the handle impacts the weight against the grip to transmit a hammering force to the jaws, dislodging the cap.

19 Claims, 2 Drawing Sheets

DISLODGEMENT DEVICE

FIELD OF THE INVENTION

The invention relates to dislodgement devices, and more particularly to such devices in which a weight member is drawn sharply against an anvil component to transmit a hammering force to the object to be dislodged.

BACKGROUND AND SUMMARY OF THE INVENTION

It is often necessary to remove the cap on a pipe wherein the cap is close fit to the pipe and difficult to access. Often the cap will be "frozen" to the pipe, for example, with steel pipes which have become rust bound, or with plastic pipes, such as formed of polyvinyl chloride (PVC) plastic, wherein the cap has been push fit onto the pipe, so close as to be virtually impossible to remove without some form of hammering action. Such pipes are often deeply buried in holes or shafts making it extremely difficult to get to a vantage point beneath the cap so that a hammering action can be delivered to the underside of the cap to dislodge it. Lifting jacks of various sorts have been devised, for example, in which tongues are provided with grappling hooks and hoisted over an area to be lifted by a standard. These devices have pre-set dimensions and often involve tedious steps in set-up and use. See, for example, Weber U.S. Pat. No. 268,328 and Parks U.S. Pat. No. 802,588. A number of devices have suggested the use of curved grabbers for specialized purposes such as in lamp removal or to pull battery terminals or spark plugs. See, for example, Russian U.S. Pat. No. 430,525; Kratky U.S. Pat. No. 1,996,967; and Clark U.S. Pat. No. 4,125,938. Various hammering mechanisms have been proposed to remove valve caps, nails and staples, axles and engine components, or the like, such as in Seppmann U.S. Pat. No. 1,525,894; Brouhard et al U.S. Pat. No. 1,381,890; Blume et al U.S. Pat. No. 1,627,477; Colerick U.S. Pat. No. 1,747,053; Gadberry U.S. Pat. No. 3,739,452; and Smith U.S. Pat. No. 3,280,455. A variety of other mechanisms have been proposed for engaging the bight portion of a pulley, cap or the like, to pull or otherwise draw the object away from its seat. See, for example, Cooney U.S. Pat. No. 1,877,011; Johnson U.S. Pat. No. 2,851,769; Swedish U.S. Pat. No. 189,617; Johnson et al U.S. Pat. No. 1,893,414; Sturm U.S. Pat. No. 2,519,204; Knudsen U.S. Pat. No. 2,561,577; Carlson et at U.S. Pat. No. 3,177,571; and Lunycz U.S. Pat. No. 4,122,599.

None of these devices are useful to accomplish the desired purpose of removing strongly held objects such as a "frozen" cap from a pipe. Those devices using a jack and standard require a surface that must be capable of supporting the standard without dig-in and these devices generally lack the flexibility necessary for many on-site uses. Those devices which employ a hammering operation do so in a manner wherein the hammering component is held by the hand and quickly slid smartly, upwardly against a retainer such as a nut or alike. These devices inherently impart a limited amount of hammering force.

The present invention overcomes the deficiencies of the art and provides a dislodgement device which can not only be used to readily and rapidly dislodge a frozen cap from a pipe, but includes principles of operation that are adaptable to a number of other situations where dislodgement of a problem object is desired. In the present invention, a device is provided for dislodging an object, for example a cap that is close fit over the top of an upright pipe, in which a handle and a grip are interconnected by means of slide bars and a shank with a weight member and an impact member. The handle and grip are each formed to be held by a user. The impact member can be a pair of tongs. The slide bars are fixed to the weight member, disposed through one end of the grip and connected to the handle. The shank is slidably disposed through the weight, and is fixed to the grip on one side of the weight and to the tongs on the other side of the weight. The tongs include a plurality of pivotally connected links and are formed with elongate arms terminating distally with jaws formed to impact against a horizontally disposed surface of the cap. The tongs tend to close when freely suspended from the shank enabling it to slip over the cap to contact it from below the cap. Lifting of the handle impacts the weight against the grip to transmit a hammering force to the jaws, dislodging the cap.

More particularly, a dislodgement device is provided that includes a handle formed to be held by one hand of a user and a grip below the handle formed at one end so as to be held by the other hand of a user. The grip defines a pair of openings at its other end through which a pair of slide bars extend and which are fixed to the handle. The lower ends of the slide bars are fixed to a weight member so that the handle can draw the weighted member up against the underside of the grip. The weighted member is centrally formed with an opening to accommodate a shank which is fixed to the underside of the grip and on its opposite end to a yoke which serves as a fulcrum for a pair of tongs.

The tongs are formed distally with jaws that are curved to fit around a pipe structure so that the upper edges of the jaws can impact against the bottom edge of the cap. The tongs include a plurality of pivotally connected links and are formed with distal elongate arms terminating at the jaws. This structure causes the tongs to tend to close when freely suspended from the yoke, enabling a worker to simply slip the tongs over the cap on a pipe, the jaws sliding along the surface of the cap until it reaches the pipe and then rests against the surface of the pipe. By pulling upwardly on the grip, the worker then secures the impact surface of the jaws against the horizontally disposed underside surface of the cap. At that point, with the worker's other hand on the handle, he simply has to quickly raise that handle to smartly draw the weight, as a hammer, against the grip, which serves, at that point, as an anvil for the hammer. This results in transmitting of a hammering force to the jaws of the tongs with consequent shock dislodgement of the cap from the pipe.

DETAILED DESCRIPTION

Figure 1:
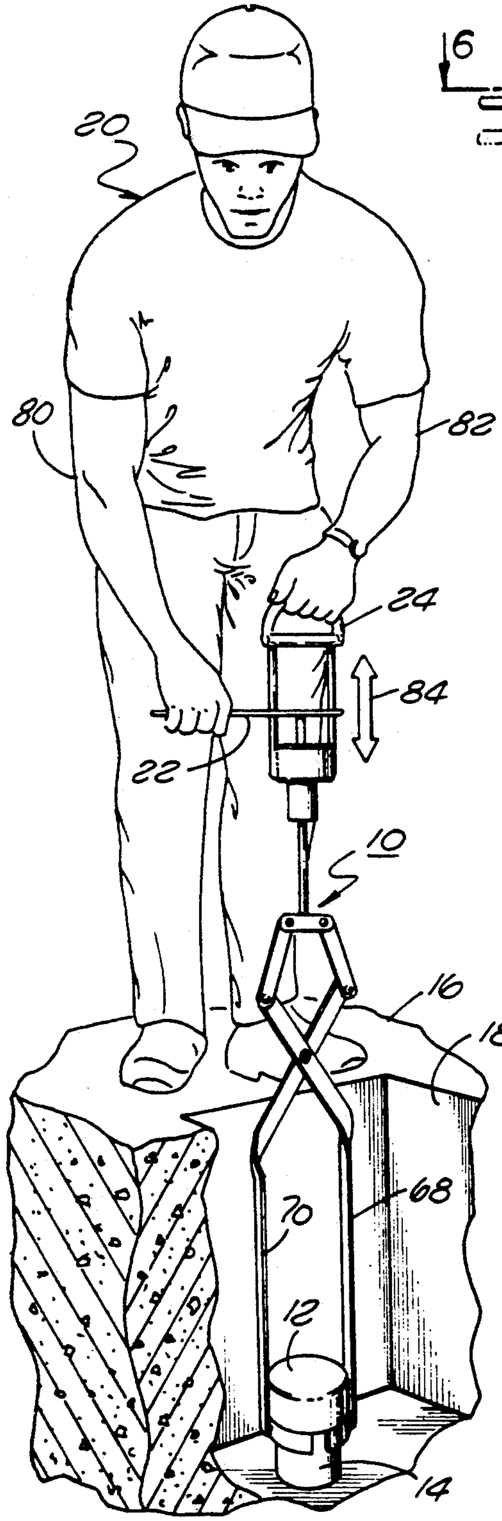
FIG. 1 is a perspective view of the dislodgement device being used by a worker in the field to dislodge a cap "frozen" to the top end of an upright pipe.

Referring to FIG. 1, the dislodgement device 10 is shown in this embodiment being used as a tool to dislodge a "frozen" cap 12 from an upright pipe 14 that is located a substantial distance below the ground 16 in a shaft 18, or other opening. A workman 20 is holding the dislodgement device 10 with both hands, and is about the use the device to exert a hammering force on the cap 12 to dislodge it.

Figure 2:
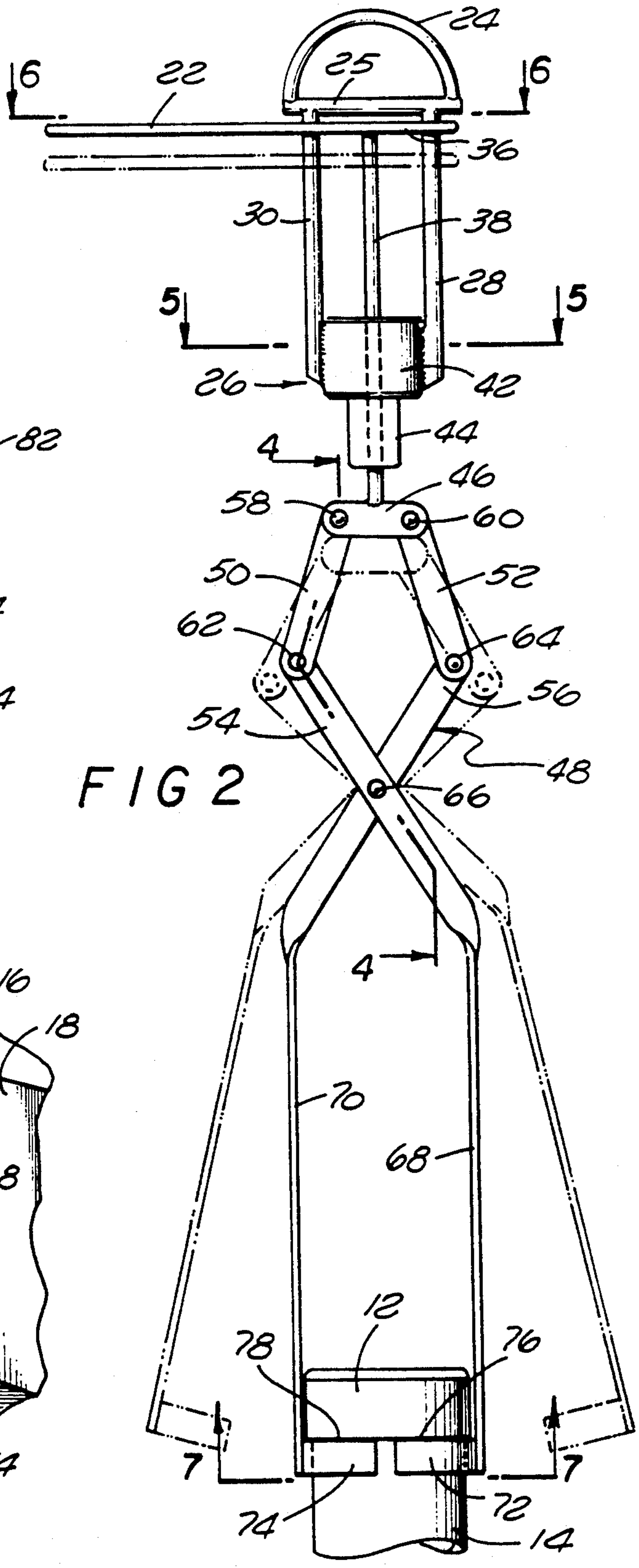
FIG. 2 is an elevational view of the dislodgement device closed about a pipe below a cap, just prior to a hammering blow, but also showing the tongs in open position in shadow.
Figure 6:
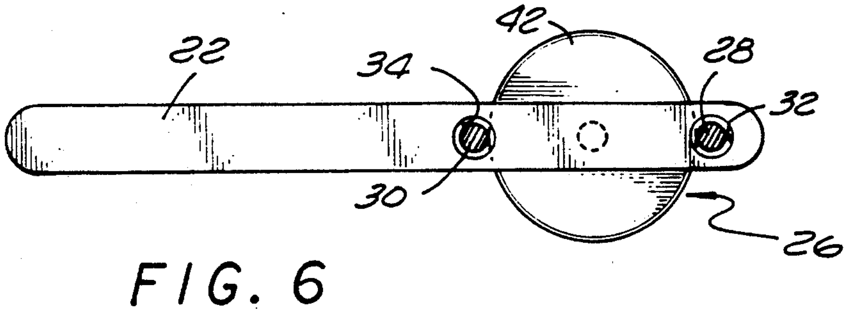
FIG. 6 is a cross-sectional view on line 6—6 of FIG. 2 showing the grip and relationship of the slide bars and weight.

Referring additionally to FIG. 2, the dislodgement device includes a grip 22, a handle 24, a weight member 26, and a pair of slide bars 28 and 30 connecting the weight 26 to the handle 24. Referring as well to FIG. 6, the grip 22 is formed with a pair of slide bar openings 32 and 34 at one end through which the slide bars 28 and 30 respectively extend. The handle 24 is arcuate and is connected to the slide bars 28 and 30 above the grip 22 by means of a cross-bar 25.

Figure 5:
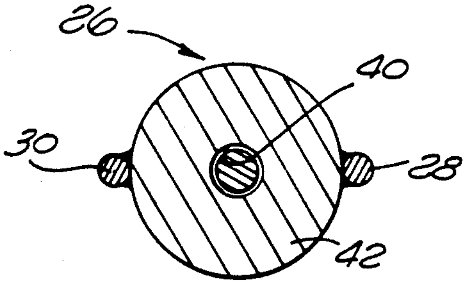
FIG. 5 is cross-sectional view on line 5—5 in the direction of the arrows, showing a detail of the weight, slide bars, and shank.
Figure 7:
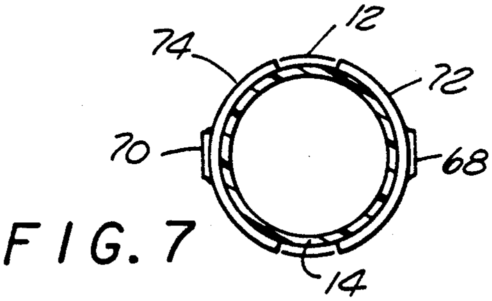
FIG. 7 is a cross-sectional view on line 7—7 of FIG. 3 showing the disposition of the jaws of the tongs on the pipe.

A shank 38 is connected, for example by welding, to the bottom surface 36 of the grip 22. Referring also to FIG. 5, the shank 38 extends through a centrally formed shank opening 40 in the weight 26. As shown, the slide bars 28 and 30 are welded onto opposite sides of the weight 26. Other than the centrally formed shank opening, the weight 26 is solid throughout to provide a massive hammer. In this particular embodiment it consists of a top member 42 welded to a narrower member 44 which serves to extend the central opening 40 to facilitate a smoother movement of the shank 38.

Figure 4:
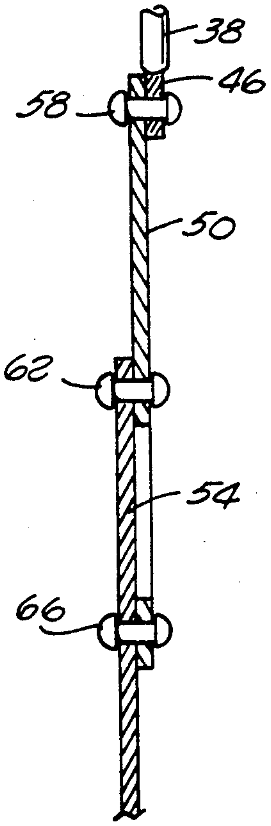
FIG. 4 is a cross-sectional view on line 4—4 of FIG. 2 in the direction of the arrows, showing the pivotal connections between the links of the tongs and a yoke therefor.

The shank 38 is fixed by welding as its lower, distal end, to a yoke 46 which serves as a fulcrum for a pair of tongs 48. Referring additionally to FIG. 4, the tongs 48 include a plurality of pivotally connected links, including proximal links 50 and 52 and distal links 54 and 56. Pivot means, which in this embodiment are rivets 58 and 60 (but which can be bolt and nut connectors), pivotally connected the proximal links 50 and 52 respectively to the yoke 46. Other rivets 62 and 64 pivotally connect the lower or distal ends of the proximal links 50 and 52 to the upper or proximal ends of the distal links 54 and 56. Another rivet 66 medially forms a cross-over connection between the distal links 54 and 56 providing the distal links 54 and 56 with a scissor-like action. It will be seen that the proximal links 50 and 52 are a match pair as are the distal links 54 and 56.

The tongs include a pair of elongate arms 68 and 70 formed integrally with the lower ends of the distal links 54 and 56, respectively. Referring additionally to FIG. 4, the elongate arms 68 and 70 are formed with opposing arcuate jaws 72 and 74, respectively. As shown, the jaws are sized so as to closely embrace the standing pipe 14 just below the cap 12 so that the upper surfaces 76 and 78 of the jaws 72 and 74, respectively, contact the underside of the cap 12. Pipes encountered on construction sites are generally of standard sizes so that only a few standard size dislodgement devices are needed.

Figure 3:
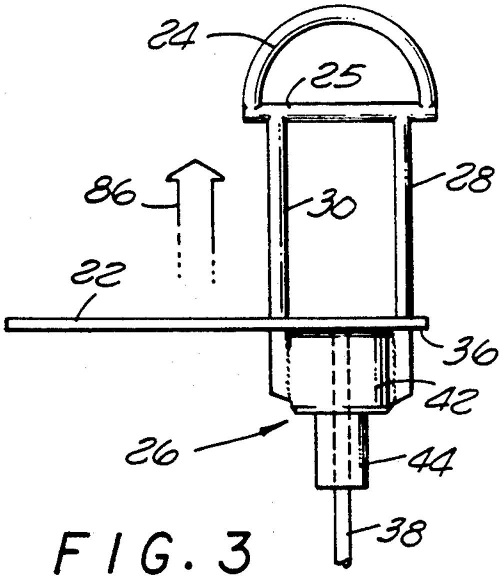
FIG. 3 is a view of the grip, handle, slide bars, and weight following drawing of the handle to a hammering action.

Referring back to FIG. 1, and also to FIGS. 2 and 3, an advantage of the present invention is that it enables a worker to readily slip the dislodgement device over the end of a cap 12 and then to use both hands to exert maximum hammering force against the cap 12. The manner of suspension of the tongs 48 is such that the tong arms 68 and 70 tend to close when freely suspended from the shank 38. When so closed, the tongs sit on top of the cap 12. The workman simply has to lower it over the cap 12 whereupon the tong arms 68 and 70 bounce away as shown in FIG. 2 and then close again on the pipe below the cap. The workman then, simply, lifts the grip up, say with his right hand 80, to bring the top edges 76 and 78 of the jaws 72 and 74, respectively, against the underside of the cap 12. Then with his left hand holding the handle 24, he smartly moves the handle upwardly as shown by the arrow 84 in FIG. 1 (86 in FIG. 3) until the weight 26 impacts, as a hammer, against the underside 36 of the grip 22, which underside 36 serves as an anvil for the hammer, as shown in FIG. 3. This movement sends a strong hammering shock to the jaws 72 and 74 which is imparted to the cap 12, dislodging it from the pipe 14.

It will be seen that a very convenient, easy to use, and very effective dislodgement tool has been provided. Modifications, of course, can be made to accommodate the tool to various sized pipes or to other objects to be dislodged and all are intended to be covered by the invention which is limited only the appended claims.

I claim:

1. A dislodgement device, comprising:
- a handle formed to be held by one hand of a user;
- a grip formed to be held by the other hand of a user and defining at least one opening, said handle being disposed on one side of said grip;
- a weight member on the opposite side of said grip;
- weight member support means slidably disposed through said at least one opening in the grip, connecting the weight member to the handle whereby to enable the handle to draw the weight member against the grip;
- an impactor; and
- impactor support means slidably disposed through the weight member, connecting the impactor to the grip whereby drawing of the weight member against the grip transmits a hammering force to the impactor.

2. The device of claim 1 in which said grip has a pair of openings, said weight member support means comprises a pair of slide bars extending through the openings of said grip, fixed on one side of said grip to opposite sides of said weight member and fixed on the opposite side of said grip to said handle.

3. The device of claim 2 in which said handle includes a cross bar spanning said slide bars.

4. The device of claim 1 in which said impactor comprises a pair of tongs formed distally with jaws to impact against a surface of an object to be dislodged.

5. The device of claim 4 in which said impactor includes a yoke pivotally connected to said tongs whereby to serve as a fulcrum for said tongs, said impactor support means comprising a shank distally connected to said yoke.

6. The device of claim 5 in which said yoke is fixed to said shank.

7. The device of claim 5 in which said pair of tongs comprises a plurality of pivotally connected links including distal links and proximal links, pivot means medially forming a crossover connection between said distal links, pivot means connecting said proximal links to said distal links, and pivot means connecting said proximal links to said yoke.

8. The device of claim 7 in which said distal and proximal links comprise respective matched pairs of links.

9. The device of claim 4 in which said pair of tongs comprises a plurality of pivotally connected links and are formed with distal elongate arms terminating at said jaws, whereby said tongs tend to close when freely suspended from said impactor support means.

10. A dislodgement device comprising:

a handle formed to be held by one hand of a user;

a grip formed at one end so as to be held by the other hand of a user and defining a pair of slide bar openings at its other end;

a weight member formed centrally with a shank opening;

a pair of slide bars extending through the slide bar openings in said grip, fixed on one side of said grip to opposite sides of said weight member and fixed on the opposite side of said grip to said handle, whereby to enable the handle to draw the weight member against the grip;

a pair of tongs formed distally with jaws to impact against a surface of an object to be dislodged, and a yoke pivotally connected proximally to said tongs whereby to serve as a fulcrum for said tongs; and a shank connected to said yoke and slidably disposed through the weight member, connecting the tongs to the grip whereby drawing of the weight member against the grip transmits a hammering force to the jaws of said tongs.

11. A device for dislodging a cap that is close fit over the top of an upright pipe, comprising:

a handle formed to be held by one hand of a user;

a grip formed to be held by the other hand of a user disposed below said handle and having at least one opening;

a weight member disposed below said grip;

weight member support means slidably disposed through the opening in said the grip, connecting the weight member to the handle whereby to enable the handle to draw the weight member against the grip;

a pair of tongs disposed below said weight member and formed distally with jaws to impact against a horizontally disposed surface of said cap; and tongs support means slidably disposed through the weight member, connecting the tongs to the grip whereby drawing of the weight member against the grip transmits a hammering force to the jaws of said tongs;

said tongs including a plurality of pivotally connected links and formed with distal elongate arms terminating at said jaws, whereby said tongs tend to close when freely suspended from said impactor support means.

12. The device of claim 11 in which said grip has a pair of openings, said weight member support means comprises a pair of slide bars extending through the openings in said grip, fixed on one side of said grip to opposite sides of said weight member and fixed on the opposite side of said grip to said handle.

13. The device of claim 12 in which said handle includes a cross bar spanning said slide bars.

14. The device of claim 11 including a yoke pivotally connected to said tongs whereby to serve as a fulcrum for said tongs, said tongs support means comprising a shank distally connected to said yoke.

15. The device of claim 14 in which said yoke is fixed to said shank.

16. The device of claim 14 in which said pair of tongs comprises a plurality of pivotally connected links including distal links and proximal links, pivot means medially forming a crossover connection between said distal links, pivot means connecting said proximal links to said distal links, and pivot means connecting said proximal links to said yoke.

17. The device of claim 16 in which said distal and proximal links comprise respective matched pairs of links.

18. A device for dislodging a cap that is close fit over the top of an upright pipe, comprising:

a handle formed to be held by one hand of a user;

a grip disposed below said handle, formed at one end to be held by the other hand of a user and defining a pair of slide bar openings at its other end;

a weight member disposed below said grip, formed centrally with a shank opening;

a pair of slide bars extending through the slide bar openings in said grip, fixed on one side of said grip to opposite sides of said weight member and fixed on the opposite side of said grip to said handle, whereby to enable the handle to draw the weight member against the grip;

a pair of tongs formed distally with jaws to impact against a horizontally disposed surface of said cap, and a yoke pivotally connected proximally to said tongs whereby to serve as a fulcrum for said tongs; and a shank connected to said yoke and slidably disposed through the weight member, connecting the tongs to the grip whereby drawing of the weight member against the grip transmits a hammering force to the jaws of said tongs.

19. A dislodgement device, comprising:

a handle formed to be held by one hand of a user;

a grip formed at one end so as to be held by the other hand of a user and defining a pair of slide bar openings at its other end;

a weight member formed centrally with a shank opening;

a pair of slide bars extending through the slide bar openings in said grip, fixed on one side of said grip to opposite sides of said weight member and fixed on the opposite side of said grip to said handle, whereby to enable the handle to draw the weight member against the grip;

an impactor; and a shank connected to said impactor and slidably disposed through said weight member, connecting the impactor to the grip whereby drawing of the weight member against the grip transmits a hammering force to the impactor.

* * * * *